Sept. 23, 1969    G. O. WESTERLUND    3,468,787
GRAPHITE ELECTRODES WITH DOUBLE-WALLED LOOP CURRENT
LEAKAGE SEAL AND ELECTROLYTIC CELL THEREWITH
Filed Aug. 31, 1967    7 Sheets-Sheet 2
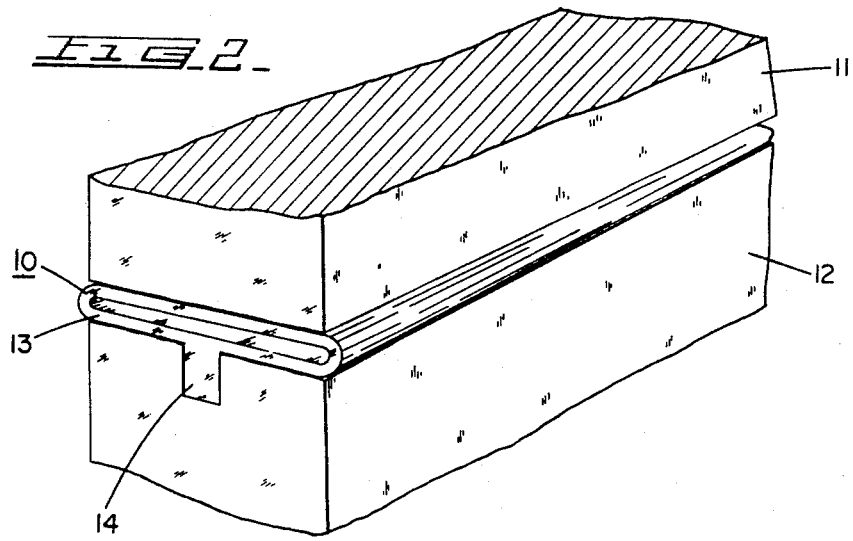
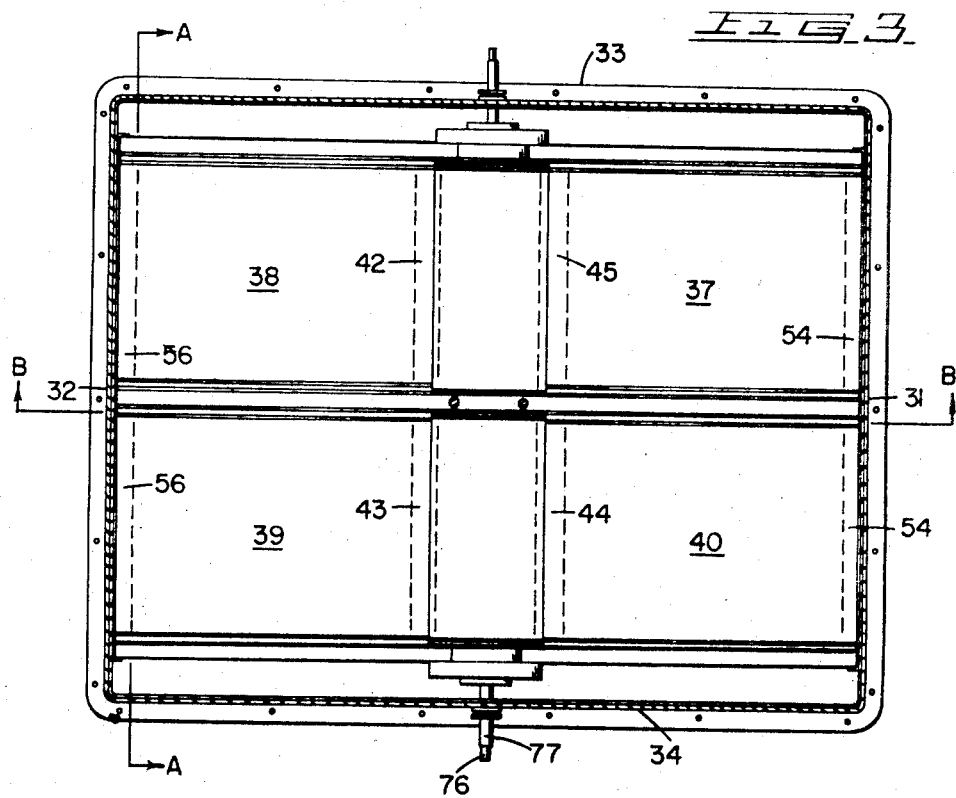

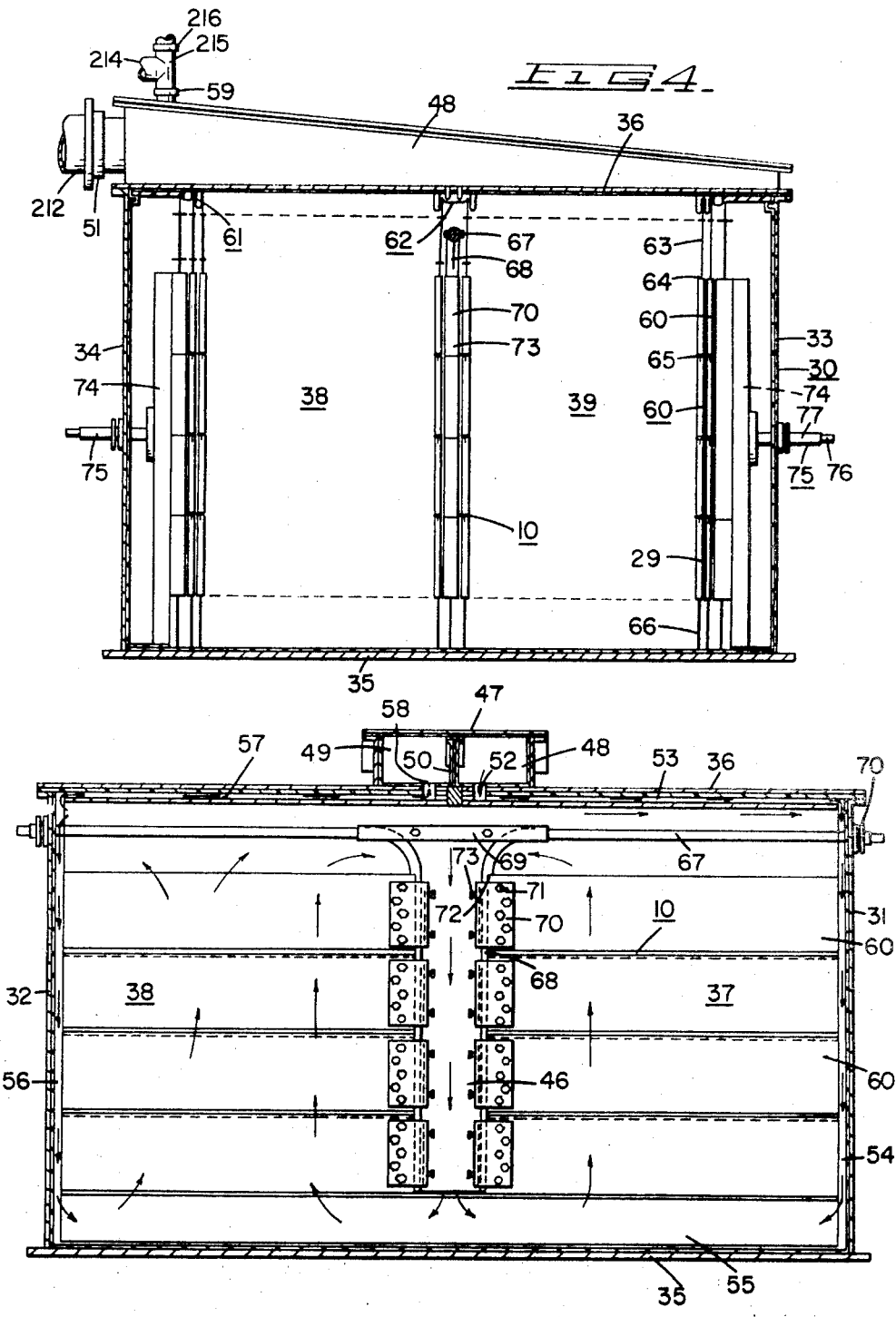

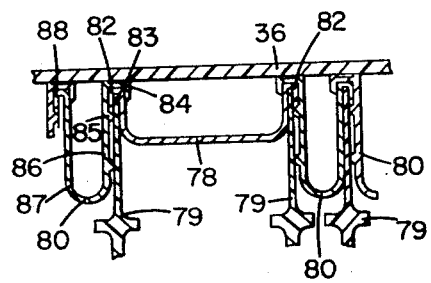
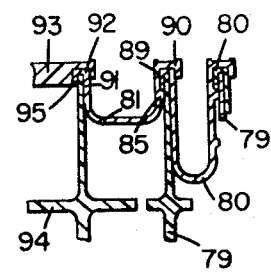
FIG. 6.
FIG. 7.
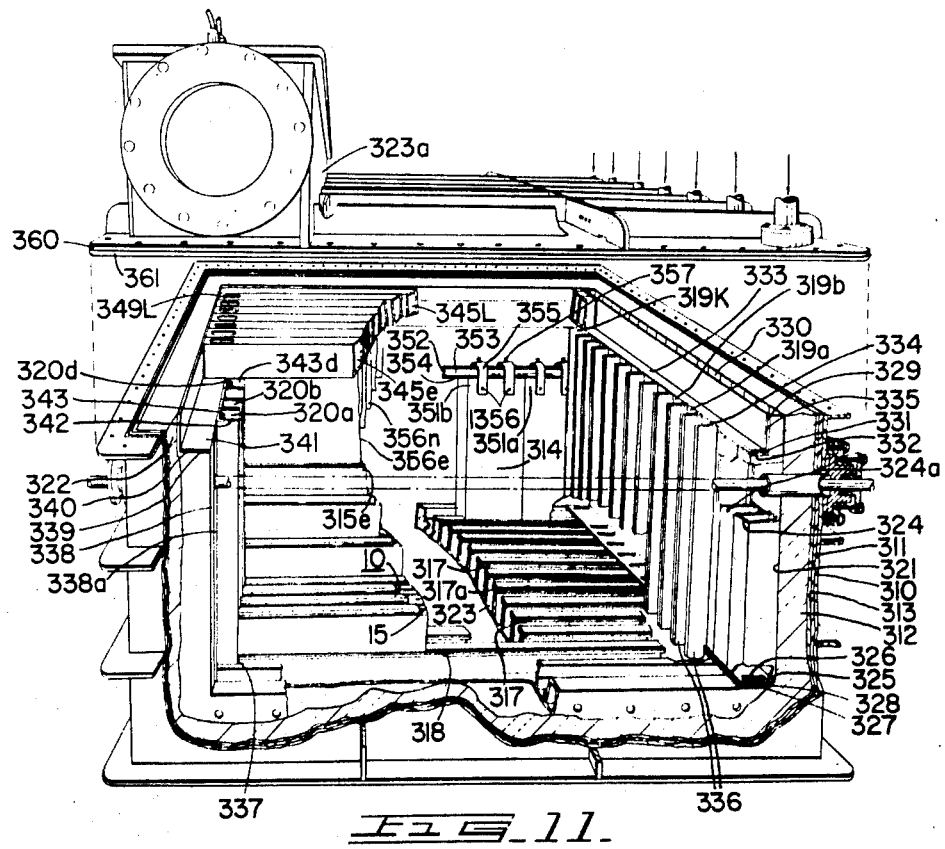
FIG. 11.

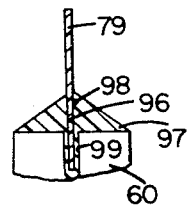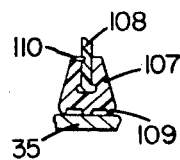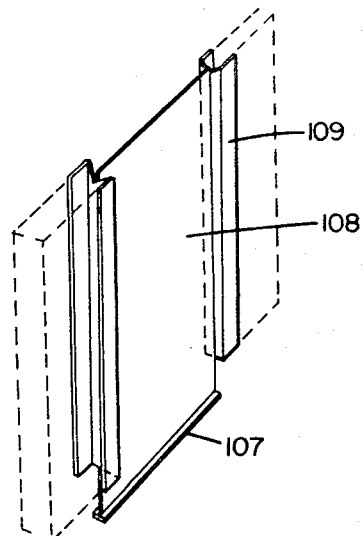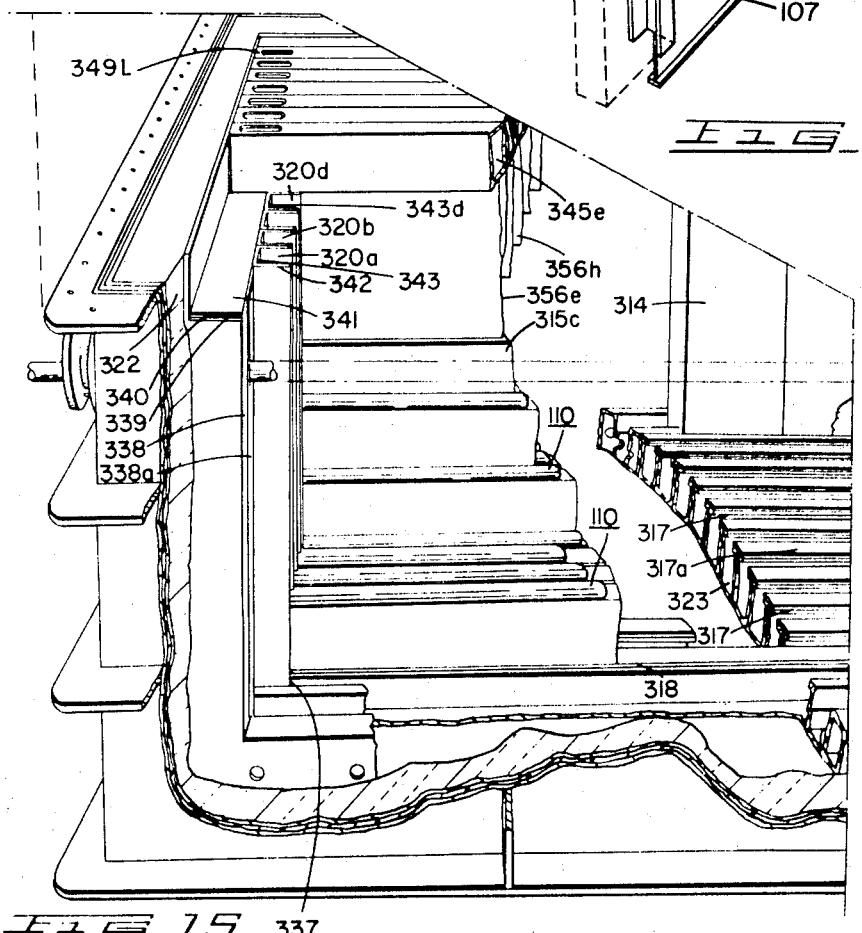

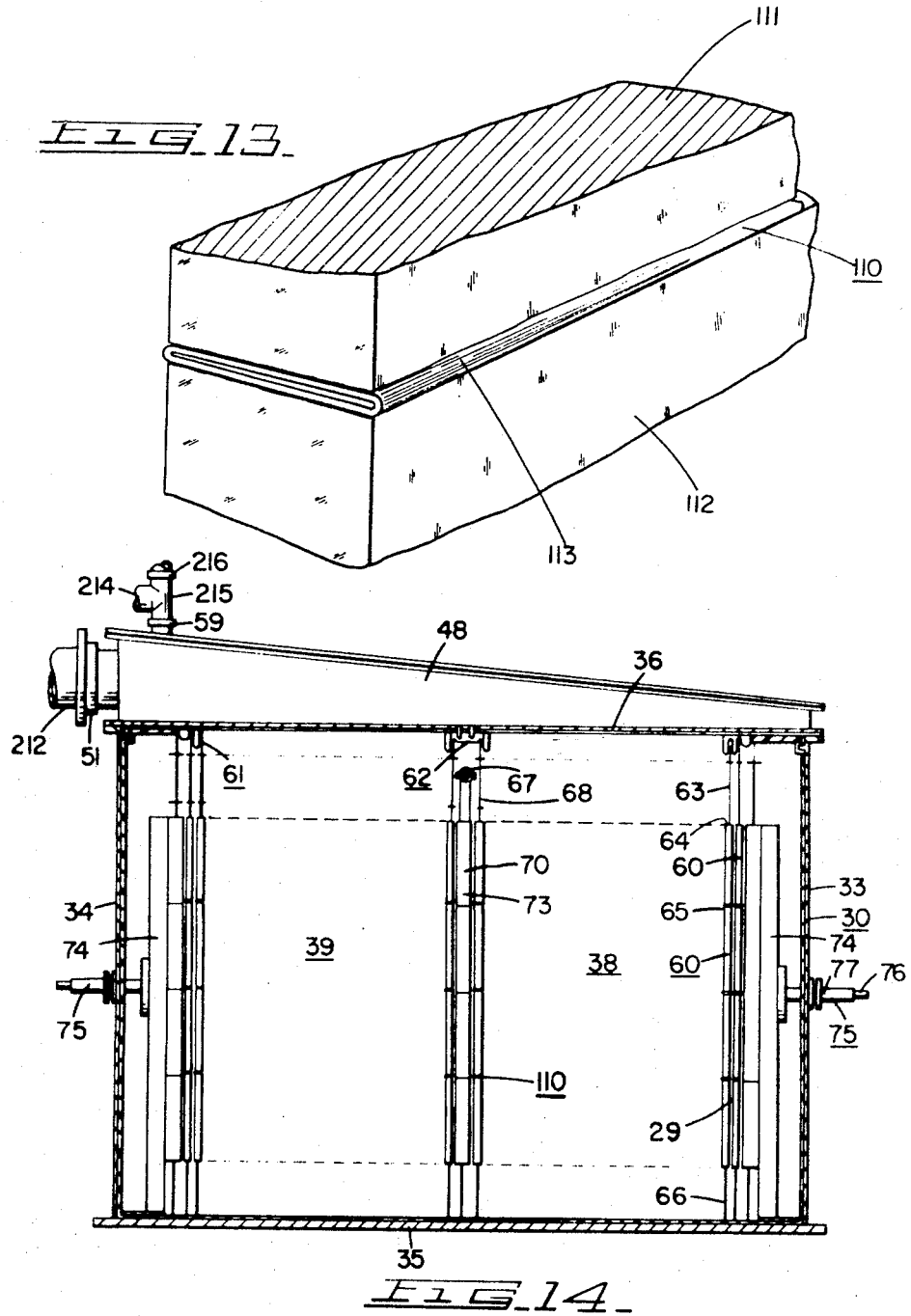

United States Patent Office 3,468,787
Patented Sept. 23, 1969

3,468,787
GRAPHITE ELECTRODES WITH DOUBLE-WALLED LOOP CURRENT LEAKAGE SEAL AND ELECTROLYTIC CELL THEREWITH
Gothe O. Westerlund, Vancouver, British Columbia, Canada, assignor to Chemech Engineering Ltd., Vancouver, British Columbia, Canada
Filed Aug. 31, 1967, Ser. No. 664,834
Claims priority, application Canada, June 27, 1967, 994,092
Int. Cl. B01k *3/04;* C22d *1/02*
U.S. Cl. 204—268          29 Claims

ABSTRACT OF THE DISCLOSURE

A new seal is provided according to this invention. The invention in one of its aspects includes the combination of at least two plate-like graphite electrodes which are stacked one upon the other. Between the two graphite electrodes is disposed a current leakage preventing seal. The seal is formed out of a thin walled hollow tube. The tube is formed of resiliently deformable electrically non-conductive thermoplastic material. Whent he seal is disposed between the two plate-like graphite electrodes, the weight of the stacked electrodes urges the tube into a collapsed condition in the form of a substantially straight double walled loop, the surfaces of the loop following the contours of the opposed graphite faces.

---

In one particular embodiment, the lower of the two plate-like graphite electrodes is provided with a longitudinally extending groove, and the hollow tube is also provided with an integral longitudinally extending fin formed with an protruding from the tube, so that it is disposed within the groove of the graphite electrode.

In another embodiment, the tube is formed of an electrically non-conductive thermoplastic material which is plasticized with a monomeric-type plasticizer so that when the seal is in use, he monomeric-type plasticizer is leached out, and a very strong bond is formed.

The invention in another of its aspects includes an electrolytic cell which is provided with this type of stacked graphite electrodes with the novel seal disposed therebetween.

This invention generally relates to seals. More particularly the invention relates to electrode seals for use between adjacent stacked graphite electrodes. It also relates to a novel electrolytic cell having improved operating characteristics due to better current efficiencies and minimized current leakage resultant from the use of the improved electrode seals of an aspect of this invention.

Electrolytic cells, namely these cells in which a current of electricity is passed through a salt, either in molten form or in aqueous solution form, whereby to carry out a chemical reaction to form a desired chemical product. It is manifest that in such cells, current connectors must be provided to conduct the electric current to the cathodes and/or anodes of such cells. Problems have arisen, in general, in providing such current connectors which can withstand the chemical conditions obtaining in such cells.

One particular cell for which special problems exist is a cell used for the electrolytic production of metal chlorates, particularly alkali metal chlorates, for example sodium chlorates, from a metal chloride. A particularly suitable cell is that disclosed and claimed in Canadian Patent No. 741,778 issued Aug. 30, 1966 to Goethe Oscar Westerlund. As pointed out in this patent electrolytic cells for the production of metal chlorates, using carbon electrodes, have certain disadvantages. Monopolar cells inherently have many power connections and electrolyte branches, high electrode stub losses, high voltage drop and high power losses. Furthermore, many units are required in commercial production and much large building spaces are thus needed.

Bipolar electrolytic cells designed to avoid many of the above difficulties have brought about one major problem. Most such cells were designed to operate with a gas phase above the level of the liquid and above the cell cover. The electrical connections to the graphite electrode were situated in this gas phase and accordingly, the danger of sparks occurring, with the resultant explosion danger, was always present.

In the above-identified Canadian Patent No. 741,778 issued Aug. 30, 1966 to Goethe Oscar Westerlund, an improved electrolytic metal chlorate cell is disclosed which includes current leakage preventing fluid-tight sealing mean between the closure, and current leakage preventing fluid-tight sealing means associated with the bipolar electrodes. It is important to include such seals in order to provide improved circulation within the electrolytic cell. This improved circulation results in uniform electrode wear or disintegration. Spalling of the bipolar electrodes and uneven wear are minimized and, as a result, local overheating and different rates of reaction are minimized. Improved current efficiencies are obtained by equalizing electrolyte composition, pH and temperatures throughout the cell. Harmful and undesirable side reactions are reduced and positively controlled. The seals used as cell dividers also reduce current leakage from cell to cell. The present invention is thus directed broadly to a type of electrode seal which is an improvement over the electrode seal disclosed in the above-identified Canadian Patent No. 741,778.

It is generally known that graphites for bipolar electrodes may be grooved. It is also known that a seal comprising a glass or rigid plastic sheeting may be employed. This has necessitated grooving both plates, and in order to minimize leakage, the groove has been made several times deeper than is actually necessary to hold the sheeting. This method of preventing leakage has several disadvantages. Finally, it does not normally eliminate current leakage completely since the grooves are oversized to ensure easier fit. Secondly, the cost of machining graphite increases significantly when two grooves are needed. Thirdly, the installation cost of graphite plates is higher since it necessitates matching the grooves for the fitting of the seal plate. Furthermore, it increases the tendency of breakage of graphite plates due to the weaknesses caused by the deep grooves.

Thus an object of one aspect of the present invention is the provision of fluid-tight electrode seals between stacked graphite bipolar electrodes, which operate in a sealing fashion even when the graphite plates are not straight, i.e., when the top and bottom surfaces of the graphite plates are uneven.

An object of another aspect of the present invention is the provision of fluid-tight electrode seals formed of electrically non-conductive material, i.e., any material which has a higher electrical resistance than that of the graphite electrodes.

A further aspect of the present invention is the provision of an electrode seal which is low in cost, easily installed, and does not tend to cause such operating problems as dislocation from between the graphite electrodes, which would tend to cause plugging at the liquor outlet channels.

An object of another aspect of the present invention is the provision of a bipolar electrolytic cell in which improved current efficiencies and minimized current leakage from cell to cell are attained.

Thus, by one broad aspect of this invention, there is provided, in combination, at least two plate-like graphite electrodes being provided with a central, longitudinally extending groove, the electrode seal itself comprising a hollow tube formed of resiliently deformable electrically nonconductive material, the tube including a longitudinally extending fin integrally formed with, and protruding from, the tube. The material out of which the tube is formed may be polyvinyl chloride, gum rubber, or silicone rubber. The tube may have a diameter of from 0.10 to 0.50 inch, and the wall thickness usually within the range 0.005 to 0.03 inch. The integral protruding fin is usually $1/32$ to $1/16$ inches wide and $1/8$ to $1/2$ inch deep. In one embodiment the lower electrode only is provided with the groove, and the seal is provided with a single fin. In another aspect, the upper electrode is provided with the groove.

By an aspect of the present invention, the leg of the seal is inserted in the groove in the graphite which runs along the central longitudinal axis of the graphite and which is parallel with the curvature of the plate. The graphite plate which is placed on top will then rest on the tube and compress the tube to the configuration of the graphite surface, thus securing the seal and substantially minimizing current leakage from one cell to another. Thus, according to this aspect of the invention, no tension is created between the plates and a substantially complete seal is achieved.

By another aspect of this invention, there is provided, in an electrolytic cell including: (a) a cell box with a closure, electrolyte inlet means and electrolyte outlet means; (b) a plurality of bipolar plate-like graphite electrodes stacked one upon the other and positioned in the box, the electrodes being constructed and arranged to conduct an electric current through the box and through an electrolyte adapted to be circulating within the box and through the space between adjacent stacked electrodes; (c) means spacing the stacked electrodes from the bottom of the box; (d) means spacing the stacked electrodes from the closure; (e) current leakage preventing fluid-tight seals between the closure and spacing means (d); (f) current leakage preventing fluid-tight seals between spacing means (d) and the upper electrode of the stacked electrodes; (g) current leakage preventing fluid-tight seals between the lowest of the stacked electrodes and spacing means (c); and (h) current leakage preventing fluid-tight seals between spacing means (c) and the bottom, the improvement comprising: (i) current leakage preventing fluid-tight electrode seals between adjacent electrodes in the stack, the seals each comprising a hollow tube formed of resiliently deformable electrically non-conductive material, the tube including a longitudinally extending fin integrally formed with, and protruding from, the tube and disposed within the groove, whereby the weight of the stacked electrodes urges the tube into a collapsed condition whose surface follows the contours of the opposed graphite surfaces.

By a preferred embodiment of this aspect of this invention, the electrolytic cell also includes: (j) means associated with the closure providing a distributor for the electrolyte; (k) means inhibiting the accumulation of gaseous products of electrolysis within the zone adjacent the closure; and (l) means associated with, but external of the closure, for providing an outlet for electrolyte and gaseous products of electrolysis and for at least a partial separation of electrolyte from the gaseous products of electrolysis.

Although the graphite plates should be installed with the curvature in the same direction through the use of the seals of the present invention, there is no special requirement to match graphite plates as they are installed. Furthermore, tolerances of the curvatures could be increased, thus minimizing any required machining.

By another broad aspect of the present invention, there is provided, in combination, at least two plate-like graphite electrodes stacked one upon the other, and a current leakage preventing, fluid-tight electrode seal therebetween, the seal comprising: a thin walled hollow tube formed of a resiliently deformable thermoplastic, e.g., polyvinyl chloride, plasticized with a monomeric-type plasticizer.

In this aspect of the present invention, the thin walled hollow tube may be of a precisely circular cross-section or may be of oval cross-section. The diameter of the tube should range between 0.10 and 0.50 inch. The wall thickness should be between 0.005 and 0.03 inch. While a polyvinyl chloride plasticized with a monomeric-type plasticizer is the preferred material out of which the seal is formed, any thermoplastic material which can be plasticized with a monomeric-type of plasticizer and which is an electrical non-conductor may be used. Further examples of such materials include polyvinyl dichloride. The monomeric-type plasticizers include phthalate esters, phosphate esters, sebacate esters, etc.

By another aspect of the present invention there is provided in an electrolytic metal chlorate cell including (a) a cell box having a closure, inlet means for electrolyte and outlet means for electrolyte, (b) a plurality of bipolar plate-like graphite electrodes stacked one upon the other positioned in the box, the electrodes being constructed and arranged to conduct electric current through the box and through an electrolyte adapted to be circulating therein and through the space between adjacent stacked electrodes, (c) means spacing the stacked electrodes from the bottom of the box, (d) means spacing the stacked electrodes from the closure, (e) current leakage preventing, fluid-tight seals between the closure and spacing means (d), (f) current leakage preventing, fluid-tight seals between spacing means (d) and the upper electrode of the stacked electrodes, (g) current leakage preventing, fluid-tight seals between the lowest of the stacked electrodes and spacing means (c), and (h) current leakage preventing, fluid-tight seals between spacing means (c) and the bottom, the improvement comprising: (i) current leakage preventing, fluid-tight electrode seals between adjacent electrodes in the stack, the seals each comprising a thin walled hollow tube formed of resiliently deformable, electrically non-conductive thermoplastic material plasticized with a monomeric-type plasticizer.

By a preferred embodiment of this aspect of this invention, the cell also includes (j) means associated with the closure providing a distributor for the electrolytes, (h) means inhibiting the formulation of gaseous products of electrolysis within a zone adjacent to the closure, and (l) means associated with, but external of, the closure for providing an outlet for electrolyte and gaseous products of electrolysis and for at least a partial separation of electrolyte from gaseous products of electrolysis.

In operation, when stretched out between the plates, the electrode seal, an aspect of the present invention, compresses according to the configuration of the plate surfaces and thus the tolerances for straightness of the graphite plates may be minimized. Consequently, it is feasible to use unmachined graphite electrodes in order to reduce the price considerably. The seal effectively fills the voids between the plates and thus gives a substantially liquor-tight seal.

The graphite plate which is placed on top will then rest on the tube and compress the tube to the configuration of the graphite plate surface, thus securing the seal and effectively preventing current leakage from one cell to another. Thus, according to this aspect of the invention, no substantial tension is created between the plates and a substantially complete seal is achieved.

When immersed in the electrolyte, sufficient plasticizer is leached from the plasticized thermoplastic material so as to cause hardening of the thermoplastic material. After a few days in the electrolyte, the seal is sufficiently hardened to be secured in place between the plates even when maximum cell pressure difference between the cells is experienced or when the graphite electrodes are worn out. When fully compressed the width of the seal should not exceed the width of the graphite electrodes.

Although the graphite plates should be installed with the curvature in the same direction through the use of the seals of the present invention, there is no special requirement to match graphite plates as they are installed. Furthermore, tolerances of the curvatures could be increased, thus minimizing any required machining.

In the accompanying drawings,

FIGURE 2 is an isometric view of two graphite electrodes stacked one upon the other, showing the operation of the seal of this one aspect of this invention;

FIGURE 3 is a top plan view, with the cover removed, of another electrolytic cell provided with the electrode seals of one embodiment of this invention;

FIGURE 4 is a view along the line A—A of FIGURE 3;

FIGURE 5 is a view along the line B—B of FIGURE 3;

FIGURE 6 is a central longitudinal section of one of the upper divider seals used in the electrolytic cell of Canadian Patent No. 741,778;

FIGURE 7 is a central longitudinal section of another of the upper divider seals used in the electrolytic cell of Canadian Patent No. 741,778;

FIGURE 8 is a central longitudinal section of one of the upper electrode seals used in the electrolytic cell of Canadian Patent No. 741,778;

FIGURE 9 is a central longitudinal section of one of the lower electrode seals used in the electrolytic cell of Canadian Patent No. 741,778;

FIGURE 10 is an isometric view of one of the lower electrode divider plates used in the electrolytic cell of Canadian Patent No. 741,778;

FIGURE 11 is an isometric view, in partially broken-away form, of another electrolytic cell provided with the electrode seals of one embodiment of this invention;

FIGURE 13 is an isometric view of two graphite electrodes stacked one upon the other, showing the operation of the electrode seal of this further aspect of this invention;

FIGURE 14 is a view taken along the line A—A of FIGURE 3, but modified to show the operation of the electrode seal of this further aspect of this invention; and FIGURE 15 is an isometric partial view, in partially broken-away form, of an electrolytic cell provided with the electrode seal of this further aspect of this invention.

Figure 1:
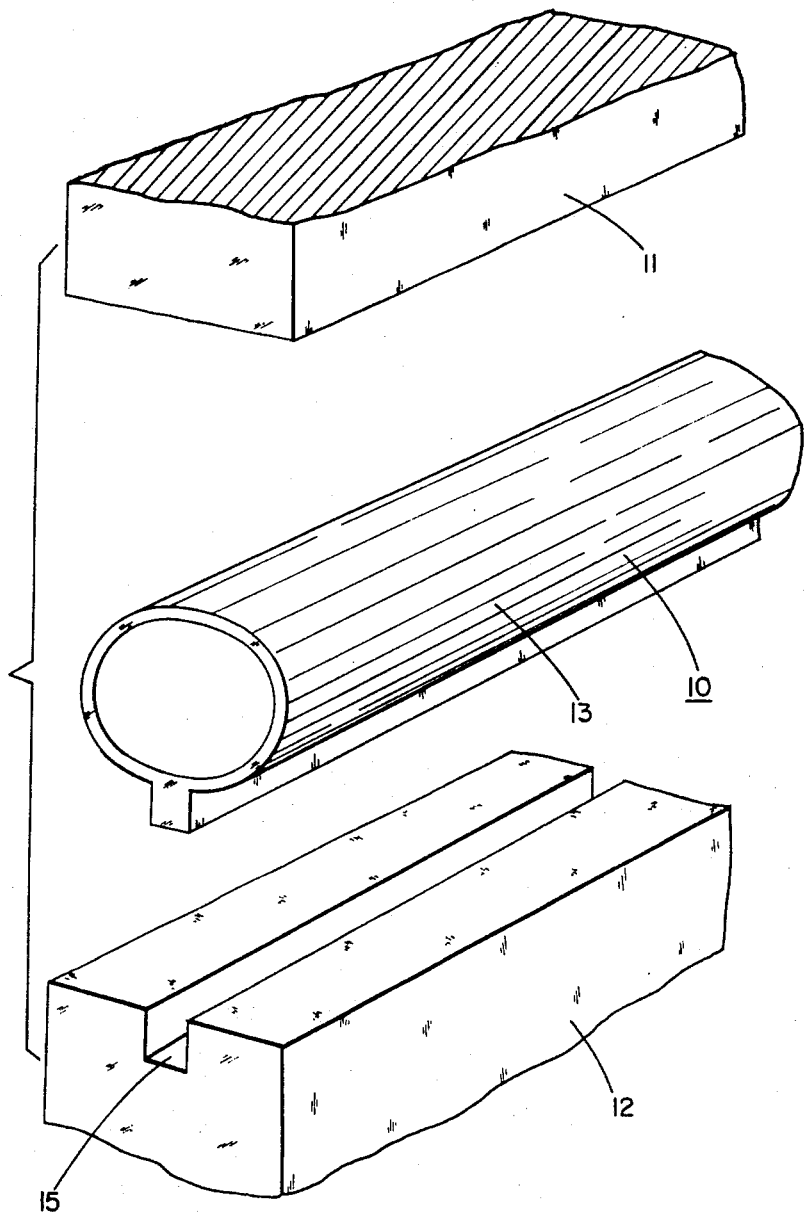
FIGURE 1 is an isometric exploded view of the graphite electrodes and the seal of one aspect of this invention.

Referring now to FIGURES 1 and 2, it is seen that the electrode seal 10 of one aspect of this invention is adapted to be disposed between two electrodes 11 and 12, each electrode being a graphite plate. The seal 10 comprises a tube 13 including a solid fin 14 integral with and protruding from the tube. The tube may be formed of any resiliently deformable, cell liquor inert material. Examples include polyvinyl chloride, gum rubber and silicone rubber. The diameter of the tube is determined by the maximum width of the tube when fully compressed which should be equal to or less than the thickness of the graphite electrode. Normally, the diameter of the tube is from 0.10 to 0.50 inch. The thickness of the wall of the tube is normally 0.005 to 0.03 inch. The fin preferably is not wider than is practical from installation point of view; usually this is 0.03 to 0.06 inch.

It is preferred that the lower graphite electrode 12 be provided with a longitudinally extending groove 15. This groove is normally equal in width and depth to the plus tolerance dimension for thickness and depth of the fin 14.

As shown in FIGURE 2, when the electrodes 11 and 12 are stacked one on top of the other, the weight of the upper electrode 11 collapses the tube 13, so that it assumes a "T-shaped" cross section, with the surfaces of the cross-piece of the "T" following the contours of the opposed surfaces of the butting graphite electrodes 11 and 12.

One preferred electrolytic cell for use with the electrode seals of this invention is that disclosed and claimed in Canadian Patent No. 741,778 issued Aug. 30, 1966 to G. O. Westerlund. This apparatus is shown in FIGURES 3, 4 and 5 suitably modified to show the electrode seal 10 of this one aspect of this invention.

Referring to FIGURES 3, 4 and 5, it is seen that the electrolytic cell consists generally of a rectangular closed vessel 30 provided with side walls 31 and 32, back wall 33, front wall 34, bottom wall 35 and top closure 36. The cell 30 itself is made of non-conducting and cell liquor inert material, such as unplasticized polyvinyl chloride, or steel lined with a non-conducting and cell liquor inert material such as Penton. ("Penton" is the registered Trademark of Hercules Powder Company for a chlorinated polyether of high molecular weight, linear in nature, crystalline in character and extremely resistant to thermal degradation at molding and extrusion temperatures.) One suitable unplasticized polyvinyl chloride which may be used is that known by the registered Trademark of Darvic.

The vessel 30 is divided in this embodiment into four quadrants 37, 38, 39 and 40 by means of longitudinal cell divider 41 and four transverse electrode end walls 42, 43, 44 and 45, spaced in such a way as to provide a central well 46. However, numerous other subdivisions may be made.

Atop the top closure and extending along the central longitudinal axis of the vessel is a header 47 divided by a central longitudinal wall 50 into an inlet header 48 and an outlet header 49. Inlet header is connected via coupling 51 to inlet conduit 212. From inlet header 48, inlet liquid enters cell 36 via inlet channel 52, flows along the top sluice 53 of the cell, then downwardly in channel 54 between wall 31 and quadrants 37 and 40 to bottom liquor layer 55 where it may mix with residual liquor in the cell. Liquor is caused to travel upwardly in the cell channels 29 between adjacent bipolar electrodes 60. Liquor may then travel downwardly in the channel 56 between wall 32 and quadrants 38 and 39 to cause an internal circulation. Liquor may also travel downwardly in central well 46 between the cell quadrants to assist in the internal circulation. Liquor and cell gases enter top sluice 57 to flow along the sluice 57 to outlet channel 58 into the outlet header 49. From outlet header 49 effluent is led through coupling 59 to a "T-joint" 215 and thence to outlet conduits 214 and 216.

Within each quadrant of the cell is a plurality of closely spaced apart, transversely extending, horizontally stacked, bipolar graphite electrodes 60. Each set of transversely extending, horizontally stacked bipolar electrodes 60 is maintained in the necessary spaced apart relationship by means of upper end seals and spacers 61 which have been disclosed in the above-identified Canadian Patent No. 741,778 but which will be more fully described hereinafter. The adjacent sets of such electrodes 60 in different quadrants are maintained in their essential spaced apart relationship by means of centre and intermediate seals and spacers 62 which have been disclosed in the above-identified Canadian Patent No. 741,778 but which will be more fully described hereinafter. Each such set of electrodes 60 is maintained in liquid-tight sealed relationship with adjacent such sets by graphite receptacle closures which have been disclosed in Canadian Patent No. 741,778 but which will be more fully described hereinafter. The upper bipolar electrode of each such set of electrodes is maintained in liquid-tight sealed relationship to its associated graphite receptacle closure 63 by means of gaskets 64 which have been disclosed in the above-identified Canadian Patent No. 741,778 but which will be more fully described hereinafter. Each vicinal bipolar electrode 60 in each set is fluid-tight sealably connected to its neighbour by means of seal 65 which have been disclosed in the above-identified Canadian Patent No. 741,778 but which will be more fully described hereinafter. Finally, the bottom bipolar electrode in each such set is maintained in its liquid-tight sealed relationship to its adjacent set by means of seal 66 which also have been disclosed in the above-identified Canadian Patent No. 741,778 but which will be more fully described hereinafter.

The cell 30 is provided with a central current connector for the monopolar electrode, having a horizontal segment 67 and a vertical segment 68. There are two such current connectors, joined by a clamp 69. The central current connector enters the cells by means of a sealing means not specifically shown but described in detail in U.S. application Ser. No. 675,814, filed Oct. 17, 1967. The vertical section of the connector is connected to each of its associated adjacent monopolar electrodes 60 by means of bolts 71, which are preferably formed of titanium. Each monopolar electrode is provided with a semi-cylindrical verically extending groove 72 so that the cylindrical connector may abut snugly and be retained thereon by bolts 73 which are also preferably formed of titanium, threaded into clamp 70 and abutting connector 68.

As pointed out in the above-identified Canadian Patent No. 741,778, the central current connector 67 and 68 is a titanium tube with a highly conductive core such as copper or aluminum and is platinized to provide a high conducting and an oxidation resistant metal skin. There is, thus, a platinum surface between the titanium and the graphite to inhibit oxidation of the titanium.

The ends of the bipolar electrode assembly have monopolar electrodes connected to a carbon connector by face-to-face contact therewith, and is bolted or otherwise rigidly secured to a connector 75, which is permitted to enter the cell in the manner as shown in FIGURE 10. Connector 75 as shown is titanium having a highly conductive core 76 of copper and oxidation resistant platinum skin 77 therearound.

While the cell has been shown with a central current connector for use with horizontal and vertical sections, the connector may, of course, be provided with the horizontal section only and the monopolar electrodes may be installed in the upright position. Furthermore, while the cell has been divided into four sub-cells or quadrants or compartments, the cell may also be designed for single compartment use by providing only one of the central electrodes or for multi-compartment use by providing more than four compartments.

It is further to be noted that the size of the compartments may be adjusted at will. If the end connectors have the same polarity, and if the number and spacing of the bipolar electrodes is equal, then the voltage pressure and current flow would be equal in all compartments.

The additional seals used in the cell will now be described with reference to FIGURES 6–10.

Referring now to FIGURES 6 and 7, hanging from the top closure 36 is a central channel 78. This central channel is connected both to the inlet header 48 via inlet 52 to provide a header channel 53, and to the outlet header 49 via outlet 58 to provide header channel 57. It is noted that channel 78 is generally U-shaped and that each of the upstanding legs of the "U" is provided with a downwardly extending flange 82. Disposed in the channel 83 between the legs of the "U" and flange 82 is the upper portion of a graphite receptacle closure divider plate 79.

Adjacent to channel 78 and plate 79 is an intermediate sealing U-shaped channel 80. One of its legs 86 is provided with a pair of horizontally extending sealing ridges 85 and terminates in a downwardly extending flange 84. The channel space between such leg and the flange 84 is just wide eough to permit the entry herein of the flange 82 of channel 78, which itself embraces divider 79. Divider 79 is kissed by ridges 85. The other leg 87 is provided at its terminus with a downwardly extending flange 88. The channel space between leg 87 and flange 88 is just wide enough to embrace plate 79. A plurality of such channel 80—plate 79 units is provided, the number being equal to the number of sets of bipolar graphite electrodes. The marginal terminal channel at the edge of the side walls is shown in FIGURE 6.

Thus, it is seen that the marginal channel 81 has one leg 89 provided on its outer surface with a horizontally extending sealing ridge 85 and it terminates in a downwardly extending flange 90. The channel space between leg 89 and flange 90 is just wide enough to permit the entry thereof of the flange 84 of the adjacent channel 80, which in turn embraces plate 79. The divider plate 79 is kissed by ridge 85. The other leg 91 is provided with a downwardly extending flange 92 whose channel space is just wide enough to embrace marginal divider plate 94. An upper end closure 92 is provided integral with the side walls, which closure is provided with a longitudinally extending groove 95 whose width is just enough snugly to embrace flange 92. Each channel 80 has a pair of upwardly extending ridges associated with its flange 84 to assure better sealing contact between the channels 80 and the top closure 36.

As seen in FIGURE 8, the lower end of each divider plate 79 is embraced by a longitudinally extending slot 96 in a sealing member 97. An "O ring" 98 provides sealing between the sealing member 97 and the divider plate 79. The sealing member is itself received in a slot 99 in the graphite electrode 60.

As seen in FIGURES 9 and 10, the bottom seal 107 is provided with three longitudinally extending sealing ridges 109, adapted to kiss the bottom wall 35, and a slot 110 extending longitudinally downwardly from the top thereof. Within slot 110 is snugly inserted circulating chamber divider 108. At the marginal edges of each divider 108 is a U-channel seat 111, adapted to abut the side walls of the vessel.

It is seen, therefore, that the lower electrode 60 of each set of electrodes rests with its weight on circulating chamber divider 108, which weight is transferred through ridges 109 to the bottom wall 35. Each superposed electrode 60 adds its weight to the lower one through ridges 102 and 103. The weight of the divider wall 79 is transmitted to the upper electrode through slot 99. Again, the combined weight of the hanging channels 78, 80 and 81 is transmitted to the upper edge of divider 79 and 94. Finally, a portion of the weight of the top closure is transmitted via ridges on flanges 84. Thus, an efficient seal is provided.

It is obvious that the materials out of which 78, 80, 81, 79, 94, 97, 100, 108, 107 and 111 are made must be an electrical non-conductor and must be cell liquor inert material. Thus, dividers 108, 94 and 79 may be made of a rigid methacrylate polymer such as that known by the registered Trademark of Plexiglas or Lucite, or alternatively may be made of a rigid polyvinyl chloride. The seals 107, 100 and 97 and the channels 78, 80 and 81 may be made of natural or synthetic rubber or of the material known by the registered Trademark of Hypalon, or of polyvinyl chloride, or of polyethylene or polypropylene.

The electrode seal 10 of one embodiment of the present invention is disposed, in the manner previously described with reference to FIGURES 1 and 2, between adjacent graphite electrodes 60 of each set of transversely extending, horizontally stacked bipolar electrodes.

In operation, the electric current flows from one cell to the other due to the potential difference and voltage pressures. The current thus flows from a monopolar electrode to one face of the bipolar electrode with a high voltage drop therebetween, due to the electrolyte circulating therebetween. Then the current passes from that one side to the other side of the bipolar electrode and since the electrical resistivity of graphite is of the order of 0.000 to 0.0005 ohm inch, there is essentially no voltage drop. The current passes from that one side to the adjacent side of an adjacent bipolar electrode with a corresponding voltage drop therebetween as the current passes through the electrolyte. The current passes this way from one side of a bipolar electrode to the other side to one side of an adjacent bipolar electrode until the current finally passes from one side of a bipolar electrode to the monopolar electrode. Thus, the electric current enters the cell unit through first current connector to the anodes 74 and travels between bipolar electrodes 60 through electrolyte in chambers 120 and thence to the monopolar electrode 74 (which is thus the cathode) and out via second current connector. Alternatively, the first current connector may be the cathode and the second current connector may be the anode.

Another electrolytic cell in which the electrode seals of an aspect of this invention may be used is the cell disclosed and claimed in copending Canadian application Ser. No. 728,684 filed in the name of G. O. Westerlund. FIGURE 11 is a drawing of the cell disclosed and claimed in that application suitably modified to show the electrode seal 10 of this one aspect of this invention.

Turning now to FIGURE 11, the electrolytic apparatus including the novel seals provided herein comprises a main rigid durable outer shell 310, which may preferably be of steel. A lining 311 is provided for the main tank and this lining 311 is firmly adherent to the inner walls of the shell 310. The lining 311 may be of natural rubber, "Hypalon," or other suitable lining which affords electrical and chemical resistance. If desired, the lining 311 for the tank may be of a rubber material which is both chemically and electrically resistant. On the other hand, it may be desirable to line the tank with an additional layer of chemically resistant brick 312. In order to provide for an integral structure, the brick 312 is cemented to the intermediate lining 311 by means, for example, of a grout or of a polyester type cement 313. The chemically resistant brick lining 312 also serves the important function of maintaining close tolerance of dimension within the cell. This serves to minimize current leakage between adjacent rods 352 where a plurality of such rods are provided.

The electrolytic apparatus of this aspect of the present invention is based on a modular construction. While the embodiment of FIGURE 11 shows one module, the cell unit may comprise any number of modules, each electrically connected in parallel or in series as may be desired. If they are connected in parallel, alternate bipolar electrodes will be connected individually to an anode busbar and a cathode bus-bar. If they are connected in series, it is only necessary to have an alternatively spaced arrangement of anode-cathode-anode, etc.

Each module of this aspect of the present invention comprises a pair of spaced apart monopolar electrodes 314 and a plurality of closely spaced bipolar electrodes 315. Each of the bipolar electrodes is provided by a plurality of stacked, longitudinally disposed graphite electrodes 315, 315a, 315b, etc. The graphite electrodes 315, 315a, 315b, 315c, etc. are interunited through the use of the electrodes seals 10 of one aspect of this invention. It is seen that the upper face of each of electrodes 315, 315a, 315b, 315c, etc. is provided with a slot 10, 10a, 10b, 10c, etc., and that the fin 12 of the electrode seal is disposed in the slot.

The lowermost graphite bipolar electrode in the stack (315) may be mounted on the bottom of the tank in a manner shown in FIGURE 9. However, an alternative construction which will be described hereinafter may also be used.

The upper bipolar graphite electrode in each stack (315c) may be rigidly secured within the module in a manner hereinbefore described with reference to FIGURE 8. On the other hand, it may be held in place in a manner to be described hereinafter.

Each module consists of a plurality of electrolyte chambers (or interelectrode spaces) 316, each of the chambers having a longitudinally extending slotted inlet means 317 to provide for the entry of the electrolyte to each chamber 316. The slotted inlet means are spaced apart by a distance 317 greater than the thickness of the graphite bipolar electrodes 315, 315a, 315b, 315c. Thus, there is provided one stack of said electrodes 315, 315a, etc. preferably situated between a pair of such slotted longitudinally extending inlet means 317. Each bipolar electrode 315, 315a, etc. of the stack rests upon a sealing flexible and compressible chemically resistant gasket 318, for example, and preferably of natural rubber, "Hypalon" or other suitable lining.

Each stack in the plurality of stacks of bipolar electrodes 315, 315a, etc. is located and positioned within the module by means of a pair of diametrically opposed vertically disposed U-shaped channel spacing members 319a, 319b, etc., 319k and 320a, 320b, etc. The spacing 321 between the arms 336 of the U is equal to the thickness of the graphite bipolar electrodes 315a, 315b, etc. These U-shaped channel members 319a, 319b, etc. 320a, 320b, etc. are situated adjacent opposite end walls 321, 322 of the module, and are formed of a chemical and electrically resistant material, such as polyvinyl chloride.

The slotted bottom inlet channels 317 for the cell module are fed from an inlet bottom manifold 323. The feed inlet to the bottom manifold 323 may be of any type. Preferably, however, it consists of a plurality of channels, 324, 324a, etc. equal in number to the number of stacks of bipolar electrodes 315, 315a, etc., i.e. equal to one less than the number of subchambers 316 within the electrolytic chamber of the module. The plurality of channels 324, 324a, etc. are situated within the main shell 310 and are disposed in a vertical direction along its respective side wall 321. The vertically extending channels are provided with a bottom plate 325 rigidly and permanently secured thereto, the bottom plate having a plurality of slotted apertures 326 therein. A bottom sealing plate 327 is also rigidly secured to the bottom manifold 323 and this plate also has a plurality of slotted apertures 326 therein. Disposed between the sealing plate 325 of the inlet channels and the sealing plate 327 of the bottom manifold is a slotted gasket 328, the slots being in registry with the slots 326 in the sealing plates 325 and 327. The slotted sealing plates 325 and 327 and the gasket 328 are each made of a suitable chemically and electrically resistant material, such as rubber or polyvinyl chloride.

Disposed at the top of inlet channels 324, 324a, etc. is an L-shaped member 329, the vertical portion of the L-shaped member defining an inlet header 330 for the inlet conduits 324, 324a, etc. The horizontally extending leg 331 of the L-shaped member 329 extends as far as the U-shaped channels 319, 319a, etc. supporting the plurality of stacks of bipolar electrodes 315, 315a, etc. and provides a ledge 332 whose purpose will be described hereinafter. Disposed on the ledge 332 is a sealing gasket 333 of a suitable chemical resistant rubbery material. This sealing gasket 333 is disposed a slight distance above the upper ends 334 of the U-shaped channel members 319, 319a, 319b, etc. Secured to the inner face of the vertically extending leg of the L-shaped member 329 is a sealing liner 335 of suitable chemical and electrical resistant material.

The lower portions 336 of the legs of each of the U-shaped channel members 319, 319a, etc. extend below the sealing plate 325 of the inlet channel to which the U-shaped channel members are attached. This extension 336 is adapted to provide a flange which enters a key way 337 defined by the longitudinally extending inlet channel 317 of each module. This cooperation, therefore, assists in locking the inlet conduit sub-assembly in its desired position.

The other plurality of U-shaped channels 320, 320a, etc. are connected to a plurality of recirculatory conduits 338, 338a, etc. which in their bottom structure, are identical with the bottom structure of the inlet conduits 324, 324a, etc. and will not, therefore, be described further. However, the upper portion of each is provided with a sealing closure plate 339 rigidly secured to the top thereof to provide a ledge 340 whose purpose will be described hereinafter. The ledge 340 is provided with a sealing gasket 341 superimposed thereon, the eventual height of the gasket 341 being slightly higher than the upper extremity 342 of the U-shaped channels which are attached to the recirculatory conduits 338, 338a, etc. The recirculatory conduits are in its upper reaches each connected to its respective chamber 356, 356e, 356h by means of a slot 343, 343a, etc. The entry to a vertically extending non-electrolytically active chamber 344, 344a, etc. as is shown in FIGURE 15. This chamber 344, 344a is connected to a longitudinally extending 345, 345a, 345b, etc. by means of a slotted communication 346, 346a, 346b, etc. on the bottom face 347, 347a, etc. of said conduit as is shown in FIGURE 16. Such a conduit is connected to an outlet header 348 by means of a slot 349, 349a, 349b, etc. on the upper diametrically opposed surface 350, 350a, 350b, etc. thereof.

As is conventional with a bipolar electrolytic cell, the terminal stack of bipolar electrodes 315, 315k is each situated adjacent a monopolar electrode 314. The monopolar electrode consists in one embodiment thereof, of a plurality of vertically extending graphite electrodes 351, 351a, 351b, etc. The graphite electrodes extend throughout the entire operative electrolytic height of the electrolytic module. One of the electrodes 314 is an anode and the other of the electrodes is a cathode, and it is irrelevant which electrode is the cathode or the anode. It is preferred that each of the connectors which connect the monopolar electrodes 314 to the positive or to the negative pole comprise a solid core 352 of high electrical conductivity, namely, of copper, aluminum or other suitable electrical conductor. The core 352 is sheathed with a tube of an electrically conducting chemically resisting material 353 such as titanium, zirconium or the like. 180 degrees of the segment of the circumference of such chemically resistant tube is platinized 354 so that all areas of contact between the graphite monopolar electrode and the connector is through a platinum-to-carbon connection. The connection is assured by means of U-clamps 355 rigidly secured as by titanium bolts to the graphite 351a, 351b, etc. and to the connector 352 by bolts 357. The electrode passes out the side walls of the electrolytic apparatus through a gland structure.

Each electrolytic sub-cell is provided with an electrolytic portion 316 bounded on its sides by the bipolar stacked graphite electrodes 315, 315a, etc. or by the bipolar electrodes 315, 315k, and a monopolar electrode 314 and a non-electrolytic chamber 344 wherein the products-of-electrolysis accumulate bounded on its sides by a plate 356, 356a, etc. of suitable electrically resistant and a chemically resistant plastic material, such as polyvinyl chloride. Each of the chemically and electrically resistant divider plates 356, 356a, etc. consists of a longitudinally extending plate 356, 356a, 356b, etc. provided at one end with a cross plate 1357, 1357a, etc. selected to be of the same width as each of the stacked bipolar graphite electrodes 315, 315a, etc. and adapted to be retained within an associated U-shaped channel member 319, 319a, etc. The cross piece 358, 358a, etc. at the other end of the longitudinally extending insulating member is provided with a slot 343, 343a, etc. in registry with a corresponding slot in the upper portion of the cross piece of the associated U-shaped channel member 320, 320a, etc., such slots communicating with the recirculatory conduit 338. Also mounted at the upper portion of each said longitudinally extending insulating plate 356, 356a, etc. is a longitudinally extending hollow conduit 345, 345a, etc. provided with a slotted opening 346, 346a, etc. in its lower face 347, 347a, etc. at a position adjacent the inlet conduit 324, 324a, etc. of the electrolytic apparatus. The longitudinally extending conduits 345, 345a, etc. is provided with a slotted aperture 349, 349a, etc. at its upper face 350, 350a, etc. adjacent the recirculatory conduit 338. The slots 349, 349a, etc. communicate directly with an outlet header 323. The outlet header 323 is rigidly secured to a cover plate 360 which is provided with a sealing gasket 361 secured thereto.

The heights of the various components within the cell are such that when the cover plate 360 is secured to the body of the cell 310, all the components of the cell are rigidly and securely pressed together to form a positive fit.

The internal circulation within cell 310 is as follows. The electrolyte and liquor enters via inlet conduit 324 and is distributed to flow upwardly from manifold 323 via slots 317.

The lighter liquor and electrolyte containing entrained gaseous products of electrolysis moves upwardly from slot 317 to the lower face 347 of conduit 345 until it reaches outlet slot 346. Then it travels through conduit 345 and through slot 349 to header 323a. Some of the lighter liquor and electrolyte moving upwardly from slot 317 is caused to enter recirculatory conduit 338 through slots 343. Such liquor and electrolyte flows downwardly in recirculatory channel 338 to slot 326 where it enters manifold 323 to be redistributed and recirculated through slots 317. Thus, flow is by means of forced external circulation by liquor pumped downwardly in conduit 324 and forced upwardly through slot 317. In addition flow is through interelectrode spaces 316, upwardly into enlarged electrolyte channels 344 and downwardly through recirculatory conduit 338.

Figure 12:
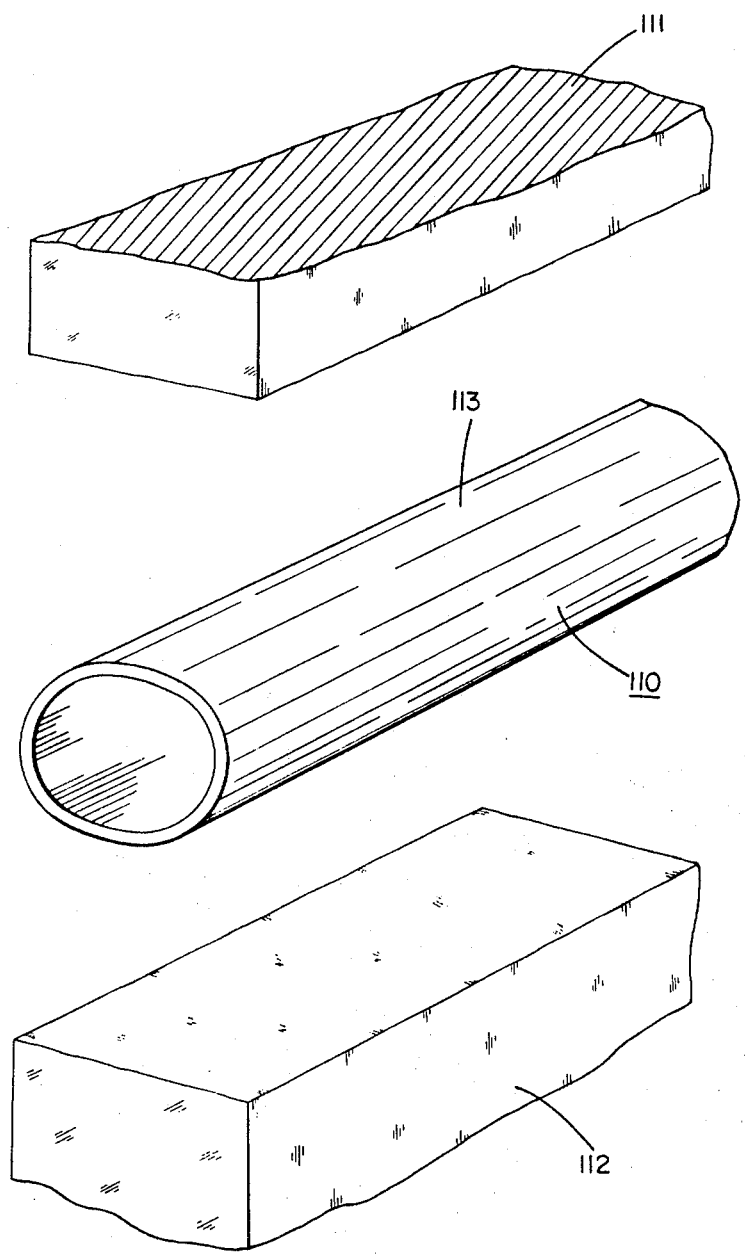
FIGURE 12 is an isometric exploded view of the graphite electrodes and the electrode seal according to a further aspect of this invention.

Referring now to FIGURES 12 and 13, it is seen that the electrode seal 110 of yet another aspect of this invention is adapted to be disposed between two electrodes 111 and 112, each electrode being a graphite plate. The seal 110 comprises a tube 113 formed of a plasticizable, resiliently deformable thermoplastic material. One preferred example is polyvinyl chloride plasticized with a monomeric-type plasticizer. Examples of suitable monomeric-type plasticizers include phthalate esters, phosphate esters, sebacate esters, etc. The diameter of the tube is determined by the maximum width of the tube 113 when fully compressed, which should be equal to or less than the thickness of the graphite electrode. Normally, the diameter of the tube is from 0.10 to 0.50 inch. The wall thickness of the tube varies from 0.005 to 0.30 inch, and the thickness of the seal when the tube is compressed is in the range of 0.01 to 0.50 inch.

As shown in FIGURE 13, when the electrodes 111 and 112 are stacked one on top of the other, the weight of the upper electrode 111 collapses the tube 113 so that it assumes a substantially flat, double-walled loop cross-section. It is not uniformly flat, however, since the upper and lower surfaces of the loop follow the contours of the butting surfaces of the upper and lower graphite electrodes, respectively. Thus, the compressed seal 110 substantially fills the voids between the upper and lower electrodes.

One preferred electrolytic cell for use with the electrode seals 110 of an aspect of this invention, is that disclosed and claimed in Canadian Patent No. 741,778 issued Aug. 30, 1966 to G. O. Westerlund. The apparatus previously shown in FIGURES 3, 4 and 5 was the cell of the aforementioned patent, suitably modified to show the novel electrode seals 10 of one aspect of this invention. FIGURE 14 is a view similar to that of FIGURE 4, but shows a further modification wherein the seals 110 of a further aspect of this invention are used.

Since FIGURE 14 is similar in most respects to FIG-

URE 11 previously described, with respect to those parts where the same reference numerals are used, no further description will be provided. However, it is noted that the electrode seals 110 of this further embodiment of this invention are disposed, in the manner previously described with reference to FIGURES 12 and 13, between adjacent graphite electrodes 60 of each set of transversely extending longitudinally stacked bipolar electrodes.

Another electrolytic cell in which the electrode seals 110 of an aspect of this invention may be used is the cell disclosed and claimed in copending Canadian application Ser. No. 728,684 filed in the name of G. O. Westerlund. FIGURE 15 is a drawing of the cell disclosed and claimed in that application, suitably modified in accordance with another aspect of this invention.

FIGURE 15 is similar in most respects to FIGURE 11 previously described, with respect to those parts where the same reference numerals are used; no further description will be provided. However, it is to be noted that the graphite electrodes 315, 315a, 315b, 315c, etc. are interunited using the seals 110 of an aspect of this invention. Thus, the seals 110 are disposed between the longitudinally extending top and bottom faces of the graphite electrodes 315, 315a, 315b, 315c, etc.

By the use of the electrode seals of aspects of this invention, particularly in the two electrolytic cells as hereinabove described, advantages accrue since there is minimum current leakage across the highly efficient electrode seals 10 or 110 of this invention.

I claim:
1. In combination, at least two plate-like graphite electrodes stacked one upon the other and a current leakage preventing seal therebetween, said seal including: a thin walled, hollow tube formed of resiliently deformable, electrically non-conductive thermoplastic material, the weight of the stacked electrodes urging the tube into a collapsed condition in the form of a substantially straight double walled loop, the surfaces of the loop following the contours of the opposed graphite surfaces.

2. The combination of claim 1 wherein the butting surface of the lower plate-like electrode is provided with a longitudinally extending groove and wherein the hollow tube includes a longitudinally extending fin integrally formed with and protruding from said tube and disposed within said groove.

3. The combination of claim 1 wherein the thin walled hollow tube is formed of resiliently deformable, electrically non-conductive thermoplastic material which is plasticized with a monomeric type plasticizer.

4. The combination of claim 2 wherein the hollow tube is formed of polyvinyl chloride, gum rubber or silicone rubber.

5. The combination of claim 3 wherein the plasticizer is a phthalate ester, a phosphate ester, or sebacate ester.

6. The combination of claim 2 wherein the diameter of the tube is such that when the tube is fully collapsed, the width of the collapsed tube is equal to or less than the thickness of the graphite electrodes.

7. The combination of claim 3 wherein the diameter of the tube is such that when the tube is fully collapsed, the width of the collapsed tube is equal to or less than the thickness of the graphite electrodes.

8. The combination of claim 2 wherein the diameter of the tube is 0.10 to 0.50 inch.

9. The combination of claim 3 wherein the diameter of the tube is 0.10 to 0.50 inch.

10. The combination of claim 2 wherein the wall thickness of the tube is 0.005 to 0.03 inch.

11. The combination of claim 3 wherein the wall thickness of the tube is 0.005 to 0.03 inch.

12. The combination of claim 2 wherein the fin is 0.03 to 0.06 inch in width and 0.06 to 0.5 inch in length.

13. The combination of claim 1 wherein the thickness of the seal, when the tube is compressed to double walled loop form, is 0.01 to 0.50 inch.

14. In an electrolytic cell including,
  (a) a cell box provided with a closure, electrolyte inlet means and electrolyte outlet means;
  (b) a plurality of bipolar, plate-like graphite electrodes stacked one upon the other and positioned in the cell box, the electrodes being constructed and arranged to conduct an electric current through an electrolyte which is adapted to be circulating within the cell box and through channels between adjacent stacked electrodes;
  (c) means spacing the stacked electrodes from the bottom of the cell box;
  (d) means spacing the stacked electrodes from the closure;
  (e) current leakage preventing, fluid-tight seals between said closure and said spacing means (d);
  (f) current leakage preventing, fluid-tight seals between said spacing means (d) and the upper electrode of the stacked electrodes;
  (g) current leakage preventing, fluid-tight seals between the lowest of the stacked electrodes and said spacing means (c); and
  (h) current leakage preventing, fluid-tight seals between said spacing means (c) and the bottom of the cell box;
the improvement comprising:
  (i) current leakage preventing, fluid-tight electrode seals between adjacent electrodes in the stack, each said seal including a thin walled, hollow tube formed of resiliently deformable, electrically non-conductive thermoplastic material, the weight of the stacked electrodes urging the tube into a collapsed condition in the form of a substantially straight, double walled loop, the surfaces of the loop following the contours of the opposed graphite surfaces.

15. The electrolytic cell of claim 14 wherein one of the butting surfaces of the electrodes is provided with a longitudinally extending groove, said tube including a longitudinally extending fin formed with, and protruding from, said tube and disposed within an associated such groove.

16. The electrolytic cell of claim 14 wherein the hollow tube is plasticized with a monomeric-type plasticizer, whereby said electrolyte is adapted to leach out sufficient of said plasticizer sufficiently to harden said seal, thereby to secure said seal between said graphite plates.

17. The cell of claim 15 wherein the hollow tube is formed of polyvinyl chloride, gum rubber or silicone rubber.

18. The cell of claim 15 wherein the lower electrode is provided with said groove.

19. The cell of claim 16 wherein the seal is formed polyvinyl chloride, plasticized with said monomeric-type plasticizer.

20. The cell of claim 19 wherein the plasticizer is a phthalate ester, a phosphate ester, or sebacate ester.

21. The cell of claim 15 wherein the diameter of the tube is such that when the tube is fully collapsed, the width of the collapsed tube is equal to or less than the thickness of the graphite electrodes.

22. The cell of claim 16 wherein the diameter of the tube is such that when the tube is fully collapsed, the width of the collapsed tube is equal to or less than the thickness of the graphite electrodes.

23. The cell of claim 15 wherein the diameter of the tube is 0.10 to 0.50 inch.

24. The cell of claim 16 wherein the diameter of the tube is 0.10 to 0.50 inch.

25. The cell of claim 15 wherein the wall thickness of the tube is 0.005 to 0.03 inch.

26. The cell of claim 16 wherein the wall thickness of the tube is 0.005 to 0.03 inch.

27. The cell of claim 16 wherein the fin is 0.03 to 0.06 inch in width and 0.03 to 0.5 inch in length.

28. The cell of claim 16 wherein the thickness of the seal when the tube is compressed to double walled loop form is 0.01 to 0.50 inch.

29. The improved electrolytic cell of claim 14 including the combination of the novel electrode seals and
(j) means associated with the closure providing a distributor for the electrolyte;
(k) means inhibiting the accumulation of gaseous products of electrolysis within the zone adjacent said closure; and
(l) means associated with, but external of, the closure for providing an outlet for electrolyte and gaseous products of electrolysis and for at least a partial separation of electrolyte from the gaseous products of electrolysis.

References Cited

UNITED STATES PATENTS

| 1,199,472 | 9/1916 | Levin | 204—256 |
| 1,360,541 | 11/1920 | Levin | 204—256 |
| 2,004,065 | 6/1935 | Kaisser | 204—269 |

FOREIGN PATENTS 741,778   8/1966   Canada.

ALLEN B. CURTIS, Primary Examiner

U.S. Cl. X.R.

204—270